3,196,182
OXIDATION OF HYDROCARBONS
Norman R. Cox, St. Albans, W. Va., assignor to Union
Carbide Corporation, a corporation of New York
No Drawing. Filed May 18, 1962, Ser. No. 195,992
8 Claims. (Cl. 260—597)

This invention relates to a novel process for the oxidation of hydrocarbons in the liquid phase. It is particularly related to a novel process for the production of methyl ethyl ketone and acetic acid by oxidation of butane in the liquid phase which process is capable of producing a higher ratio of methyl ethyl ketone to acetic acid than has heretofore been possible to achieve by the prior art methods.

Direct oxidation of aliphatic hydrocarbons such as propane, butane, pentane, hexane, heptane, or mixtures of these hydrocarbons, with an oxygen-containing gas, is well known. These oxidation processes have been carried out catalytically and non-catalytically, in the vapor phase as well as in the liquid phase, to produce aldehydes, ketones, acids, esters, etc. For example, it is well known to oxidize butane to produce acetic acid, methyl ethyl ketone, acetaldehyde, and other valuable organic compounds. However, for reasons which will hereinafter be discussed, the oxidation of butane has heretofore been directed primarily to the production of acetic acid to the substantial exclusion or minimization of methyl ethyl ketone.

Basically, the non-catalytic oxidation of butane in the liquid phase is a relatively simple process. All that is required is liquid butane and an oxygen-containing gas, charged to a suitable reaction zone, and a sufficient quantity of heat to initiate the reaction. Once initiated, the reaction is highly exothermic and adequate heat removal from and temperature control within the reaction zone become essential if "selectivity" and high operational efficiency are desired. The term "selectivity" as used herein means the selective production of a particular oxidation product or products. Although a great amount of study and research have been devoted to the subject of butane oxidation, nevertheless, the prior art is completely devoid of any teaching regarding the selective production of methyl ethyl ketone, but instead, it is directed primarily to maximizing the production of acetic acid. The reasons have been partly due to the widespread commercial necessity for acetic acid, partly due to the nature of butane oxidation process, and partly due to the geometry of the reaction zones which have heretofore been used to carry out the oxidation reaction.

Generally, the oxidation of butane has heretofore been conducted in reaction zones which have relatively low length to diameter ($L:D$) ratios of from, for example, about 1:1 to about 15:1. These prior art reaction zones will hereinafter be referred to as tank reactors. When liquid butane and an oxygen-containing gas are fed continuously to a tank reactor, methyl ethyl ketone, which is generally produced at the early stage in the oxidation reaction, is further oxidized to produce acetic acid and other organic compounds. This phenomenon is attributed to back mixing of the liquid in tank reactors when operating at commercially economical feed rates. Generally, there are no concentration gradients in tank reactors. The reactants and products are essentially completely mixed and the liquid flowing through the tank reactor is essentially homogeneous. Consequently, the oxygen-containing gas in said tank reactor has as much access to methyl ethyl ketone as it has to butane, thus resulting in the oxidation of methyl ethyl ketone to acetic acid and other organic compounds. Furthermore, methyl ethyl ketone has a greater tendency toward oxidation than butane, therefore increasing the production of acetic acid to the substantial minimization of methyl ethyl ketone. These phenomena have been further complicated by the extreme difficulty of temperature control within the tank reactor due to the highly exothermic nature of the oxidation reaction. Heat removal and temperature control have heretofore been accomplished either by slow and controlled oxidation of butane (low oxygen concentration and/or slow butane feed rate) or by using large quantities of inert diluents such as nitrogen or an inert organic compound. These methods however necessitate operation at reduced rates and capacities and they are accordingly inefficient and uneconomical commercially. Slow feed rates to the tank reactor result in long residence time of the materials therein. Similarly, the use of diluents necessitate long residence time of the materials in said reactor. This increased residence time causes further oxidation of methyl ethyl ketone to acetic acid and often results in the oxidative degradation of the desirable products at the operating conditions.

It has now been discovered that butane can be selectively oxidized to produce higher ratios of methyl ethyl ketone to acetic acid than have heretofore been possible to achieve by the prior art processes. The novel process contemplates contacting butane with an oxygen-containing gas in the presence of a liquid recycle medium and/or a normally liquid organic vehicle which serves to maintain said butane in an essentially liquid phase, in an elongated reaction zone, under critically controlled conditions regarding the operative temperature and pressure, the residence time of the liquid reaction mixture, the length to diameter ratio of said elongated reaction zone, and the like.

By practicing the novel process as described herein the selectivity of oxidation of butane to methyl ethyl ketone and acetic acid is unexpectedly enhanced by virtue of eliminating back mixing of the liquid reaction mixture during its passage through the elongated reaction zone. In this respect the flow pattern of the liquid reaction mixture within said elongated reaction zone can adequately be characterized as "plug flow" since the liquid reaction mixture flows through said zone essentially in rod-like fashion. Although there may be some localized turbulence in this type of flow, there is essentially no back mixing of the liquid over a finite length of said elongated reaction zone in the direction of liquid flow. Consequently, there is little or no tendency for the oxidation of methyl ethyl ketone to acetic acid due to back mixing which is prevalent in tank reactors.

The novel process is effected in an elongated reaction zone wherein the length to diameter ratio ($L:D$) of said zone is at least about 60:1 and upwards of about 100,000:1, or more. The diameter of the reaction zone can vary from about 0.25 inch to about 6 inches, or more. The length of the reaction zone is generally selected so that the $L:D$ ratio of said reaction zone falls within the range heretofore described.

The oxidation reaction is conveniently carried out at an elevated temperature, e.g., a temperature in the range of about 125° C. to about 250° C., and higher, and preferably at about 150° C. to about 200° C., and under superatmospheric pressure, e.g., a pressure in the range of from about 500 p.s.i.g., and lower, to about 2000 p.s.i.g., and higher, preferably at from about 700 p.s.i.g. to about 1200 p.s.i.g. to thus maintain an essentially liquid phase reaction mixture. Any vapor phase which is present in the reaction zone is substantially inert to oxidation under these conditions. Temperature control in the reaction zone, if necessary, can be achieved by providing said zone with a cooling jacket, external cooling coils, etc.

Butane feed rate to the reaction zone depends upon the volume of said zone, the production rate requirement, the rate of oxygen-containing gas, and other operating variables. However, the butane feed rate must be adjusted so that the residence time of the total liquid materials through the reaction zone (including recycle, as will hereinafter be discussed) is within the range of from about 30 seconds, or less, to about 100 minutes, or more. As used herein the residence time may be defined as the volume of the reaction zone divided by the volumetric rate of liquid through said zone. Longer residence time results in the oxidation of methyl ethyl ketone to acetic acid and may cause thermal degradation of the products at the operating conditions of the novel process.

Essentially pure oxygen, air or other oxygen-containing gases can be employed for the oxidation of butane in accordance with the method of this invention. The gas can be introduced directly into the reaction zone at one or several points. The concentration of oxygen based on the butane feed to the reaction zone is generally from about 1 to about 20 weight percent and preferably from about 5 to about 15 weight percent. The butane feed entering the reaction zone includes the recycle to the reaction zone as will hereinafter be discussed.

The novel process is carried out in the absence of a catalyst. However, well known hydrocarbon oxidation catalysts such as cobalt acetate, manganese acetate, manganese, cobalt, and the like, can be employed, if desired.

Recycle ratio to the reaction zone (the volume of recycle per volume of reaction zone per hour) can vary from about 0.1 to about 100 gallons per gallon of reaction zone per hour, though we prefer to operate with recycle ratios of from about 5 to about 30 gallons per gallon of reaction zone per hour. The recycle can contain up to about 80 weight percent butane, the remainder being methyl ethyl ketone, acetic acid, carbon dioxide, and other oxygenated organic compounds. Among such compounds are methyl acetate, ethyl acetate, formic acid, methyl alcohol, ethyl alcohol, butyl alcohol, butyric acid, etc. The relative quantities of these oxygenated organic compounds vary depending upon the operative conditions in the reaction zone and in the separating vessel. It has been found unexpectedly that when the recycle ratio increases, the ratio of methyl ethyl ketone to acetic acid in the final product mixture also increases and conversely, when the recycle ratio decreases, the ratio of methyl ethyl ketone to acetic acid also decreases. As the recycle ratio is increased the butane conversion per pass within the reactor is decreased, resulting in shorter contact time of the materials in the reactor. Consequently, there is less tendency for the methyl ethyl ketone to oxidize to acetic acid. Conversely, when the recycle ratio is decreased the butane conversion per pass is increased and the residence time of the materials in the reactor is correspondingly increased, resulting in the further oxidation of methyl ethyl ketone to acetic acid and other oxygenated organic compounds.

The recycle to the reaction zone, aside from its function of removing heat from and controlling the temperature in the reaction zone, serves an additional major function. The acetic acid, methyl ethyl ketone and the other oxygenated organic compounds in the recycle serve to maintain butane in the liquid phase in the reaction zone. The recycle, therefore, serves as a solvent for butane in the reaction zone under the operative conditions set forth in the novel process and permits the oxidation reaction of butane to take place essentially in the liquid phase.

Alternatively, a normally liquid organic solvent such as, for example, one of the oxygenated organic compounds in the recycle, particularly acetic acid or methyl ethyl ketone, or other inert solvents such as, for example, saturated aliphatic monocarboxylic acids containing from two to five carbon atoms, saturated aliphatic ketones containing from three to six carbon atoms, saturated aliphatic alcohols containing from two to six carbon atoms, alkyl esters of saturated aliphatic monocarboxylic acids containing from three to twelve carbon atoms, or mixtures of such solvents, may be introduced separately into the reaction zone in order to maintain the butane in said reaction zone essentially in the liquid phase. These solvents may be used in lieu of the recycle or supplementary thereto. However, it should be understood that in the operation contemplated by the novel process the recycle to the reaction zone serves as a solvent for butane, consequently, additional and separate introduction of solvents to the reaction zone is not required.

The equipment used to carry out the process of our invention is generally constructed of corrosion resistant materials due to the production of acetic acid and other corrosive substances. Although stainless steel has been employed in the construction of the equipment used herein other corrosion resistant alloys and materials may be employed satisfactorily.

The following examples will further illustrate the invention.

Example 1

Liquid butane was fed continuously to a stainless steel jacketed tank reactor ($L:D=9.0$) by means of a high pressure positive displacement pump. The reactor was maintained at 800 p.s.i.g. and at 180° C. The reactor temperature was controlled by passing steam through the reactor jacket. Essentially pure oxygen, precompressed to about 800 p.s.i.g., was introduced into the reactor at a point near the butane inlet in the lower section of said reactor.

The effluent from the reactor was cooled to 65° C. by means of a condenser and the cooled effluent was introduced into a separating drum which was maintained at about 800 p.s.i.g. Uncondensed gases were vented from the separating drum and the resulting cooled effluent was allowed to separate into two layers in said drum. The upper layer containing approximately 65 weight percent butane (the remainder being primarily acetic acid, methyl ethyl ketone and small quantities of other oxygenated organic compounds) was recycled to the reactor at a rate of 18 gallons per gallon of reactor per hour, and the lower layer comprising mainly methyl ethyl ketone, acetic acid and water was withdrawn as products wherefrom the various components were recovered by distillation. Oxygen fed to the reactor was about 11 weight percent of the liquid butane fed to the reactor (including liquid butane in the recycle). The residence time of the liquid materials in the reactor was 3.3 minutes and the ratio of methyl ethyl ketone to acetic acid in the products was 1 to 6.5.

Example 2

Following Example 1 but using a stainless steel jacketed elongated reactor having a $L:D=60$, the ratio of methyl ethyl ketone to acetic acid resulting from the resolution of the lower layer was 1 to 3.5. The operating conditions, the volume of the reaction zone, and the residence time were the same as in the previous example.

Example 3

Liquid butane was fed continuously to a stainless steel elongated reactor having a $L:D=16,640$ and the same volume as the reactors employed in the preceding two examples. The reactor was maintained at 930 p.s.i.g. and at 150° C. Essentially pure oxygen, precompressed to about 930 p.s.i.g., was introduced into the reactor at a point near the butane inlet in the lower section of said reactor.

The effluent from the reactor was treated in the same manner as in the previous examples. Oxygen fed to the reactor was about 11 weight percent of the liquid butane fed to the reactor (including liquid butane in the recycle). The residence time of the liquid materials in the reactor was 2.7 minutes and the ratio of recovered methyl ethyl ketone to acetic acid was about 3 to 1.

The foregoing examples indicate that the production ratios of methyl ethyl ketone to acetic acid can be markedly increased by effecting the oxidation reaction of this invention in reactors having $L:D$ ratios of at least about 60:1.

Although the invention has heretofore been described in connection with butane as the hydrocarbon feed to the reactor, other saturated aliphatic hydrocarbons having from 3 to 7 carbon atoms such as propane, pentane, hexane, heptane or mixtures thereof, may be oxidized in accordance with the process of the invention to produce valuable oxygenated organic compounds.

The products obtained in accordance with the process of the invention comprise largely methyl ethyl ketone and acetic acid. However, small quantities of water and other oxygenated organic compounds such as, for example, methyl alcohol, ethyl alcohol, ethyl acetate, etc., are also produced along with methyl ethyl ketone and acetic acid. These products can be recovered by conventional methods such as distillation, extraction, etc.

What is claimed is:

1. A process for producing oxygenated organic compounds by liquid phase oxidation of saturated aliphatic hydrocarbons having from 3 to 7 carbon atoms which includes the steps of:
    (a) continuously feeding liquid hydrocarbon and oxygen-containing gas to an elongated reaction zone having length to diameter ratio of at least about 60:1 at a rate such that the liquid flows through said reaction zone essentially in plug flow fashion,
    (b) conducting said oxidation at an elevated temperature and under superatmospheric pressure so that the oxidation of said hydrocarbon takes place essentially in the liquid phase, and
    (c) cooling the effluent from said reaction zone, recycling a portion of said cooled effluent to said reaction zone, and recovering oxygenated organic compounds from the remainder of said effluent.

2. A process for producing oxygenated organic compounds by oxidation of butane in the liquid phase which includes the steps of:
    (a) continuously feeding liquid butane and oxygen-containing gas to an elongated reaction zone having length to diameter ratio of at least about 60:1 at a rate such that the liquid flows through said reaction zone essentially in plug flow fashion,
    (b) conducting said oxidation at an elevated temperature and under superatmospheric pressure so that the oxidation of butane takes place essentially in the liquid phase, and
    (c) maintaining the liquid materials in said reaction zone at a residence time of from about 30 seconds to about 100 minutes, and
    (d) cooling the effluent from said reaction zone, recycling a portion of said cooled effluent to said reaction zone, and recovering oxygenated organic compounds from the remainder of said effluent.

3. The process of claim 2 wherein said oxidation reaction is carried out at a temperature in the range of from about 125° C. to about 250° C.

4. A process for selective production of methyl ethyl ketone by oxidation of butane in the liquid phase which process includes the steps of:
    (a) continuously feeding liquid butane and oxygen-containing gas to an elongated reaction zone having length to diameter ratio of at least about 60:1, at a rate such that the liquid flows through said reaction zone in essentially plug flow fashion,
    (b) maintaining a temperature in the range of from about 125° C. to about 250° C. in said reaction zone, and a pressure sufficient to maintain said butane essentially in the liquid phase in said reaction zone,
    (c) maintaining the liquid materials in said reaction zone at a residence time of from about 30 seconds to about 100 minutes,
    (d) cooling the effluent from said reaction zone and introducing said effluent into a pressurized vessel wherefrom uncondensed gaseous materials are vented, and
    (e) recycling a portion of said cooled effluent from said pressurized vessel to said reaction zone at a rate of from about 0.1 to about 100 gallons per gallon of reaction zone per hour, and recovering the methyl ethyl ketone from said pressurized vessel.

5. The process of claim 4 wherein said cooled effluent separates into two liquid layers; the upper layer of which comprises butane, methyl ethyl ketone and acetic acid at least a portion of which is recycled to said reaction zone at a rate of from about 0.1 to about 100 gallons per gallon of reaction zone per hour, and the lower layer of which comprises methyl ethyl ketone, acetic acid and water, which is withdrawn from said vessel and the various components are recovered therefrom.

6. A process for the selective production of methyl ethyl ketone by oxidation of butane in the liquid phase which process includes the steps of:
    (a) continuously feeding liquid butane and oxygen-containing gas to an elongated reaction zone having a length to diameter ratio of from about 60:1 to about 100,000:1 at a rate such that the liquid flows through said reaction zone essentially in plug flow fashion while maintaining an oxygen concentration of from about 5 to about 15 weight percent of liquid butane in said reaction zone,
    (b) maintaining a temperature in the range of from about 150° C. to about 200° C. and a pressure in the range of from about 200 p.s.i.g. to about 1200 p.s.i.g. in said reaction zone,
    (c) maintaining the liquid materials in said reaction zone at a residence time of from about 30 seconds to about 100 minutes,
    (d) cooling the effluent from said reaction zone and introducing said cooled effluent into a pressurized vessel wherefrom uncondensed gaseous materials are vented, and wherein the liquid separates into two layers; an upper layer comprising butane, methyl ethyl ketone and acetic acid, and a lower layer comprising methyl ethyl ketone, acetic acid and water,
    (e) recycling at least a portion of said upper layer to said reaction zone at a rate of from about 5 to about 30 gallons per gallon of reaction zone per hour, and
    (f) recovering methyl ethyl ketone and acetic acid from said lower layer.

7. The process of claim 6 wherein said oxygen-containing gas is air.

8. The process of claim 6 wherein essentially pure oxygen is used as the oxidizing gas.

References Cited by the Examiner

UNITED STATES PATENTS 2,825,740    3/58    Armstrong et al. _____ 260—533

FOREIGN PATENTS 865,747    4/61    Great Britain.

LEON ZITVER, *Primary Examiner.*